G. SMITH.

Assignor to W. W. HANNA.

Coal-Scuttle.

No. 8,428. Reissued Sept. 24, 1878.

WITNESSES

Villette Anderson.

F. J. Masi.

INVENTOR

George Smith by E. W. Anderson

ATTORNEY

N. PETERS, PHOTO-LITHOGRAPHER, WASHINGTON, D. C.

UNITED STATES PATENT OFFICE.

GEORGE SMITH, OF BROOKLYN, NEW YORK, ASSIGNOR, BY MESNE ASSIGNMENTS, TO WILLIAM W. HANNA.

IMPROVEMENT IN COAL-SCUTTLES.

Specification forming part of Letters Patent No. 56,812, dated July 31, 1866; Reissue No. 8,428, dated September 24, 1878; application filed July 31, 1878.

*To all whom it may concern:*

Be it known that I, GEORGE SMITH, of the city of Brooklyn, in the county of Kings and State of New York, have invented certain new and useful Improvements in Coal-Scuttles; and do hereby declare the following to be a full, clear, and exact description of the same, reference being had to the drawings which accompany and form part of this specification.

Figure 1:
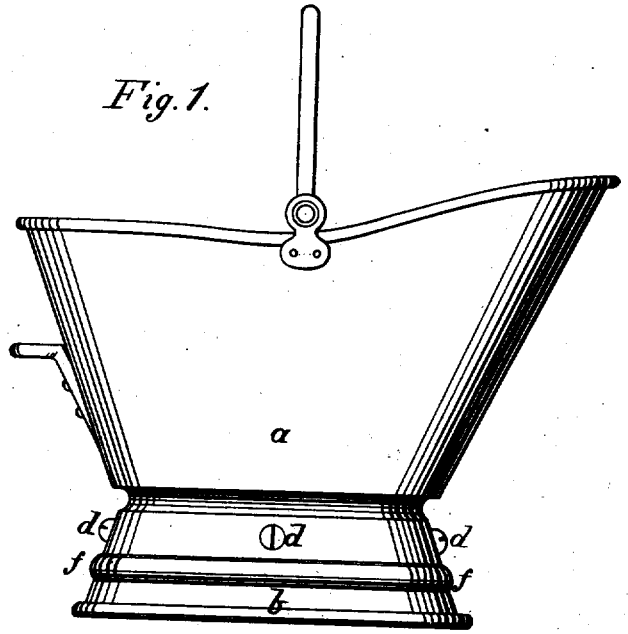
Figure 2:
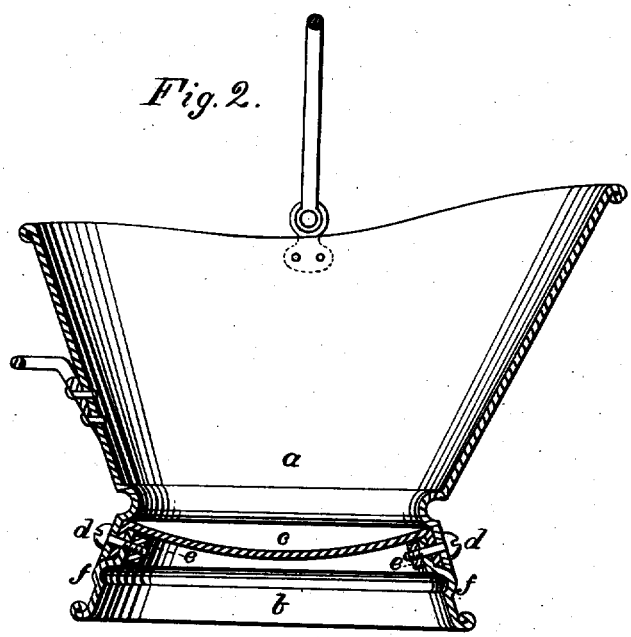

Of these drawings, Figure 1 represents a side elevation of my improved coal-scuttle; and Fig. 2 represents a sectional view of the same, showing the bottom, base, and body combined.

Similar letters of reference indicate corresponding parts in the several figures.

The common coal-scuttle known to the trade for many years past, and in very general use at the present time, is formed of three parts, all composed of metal, namely: a rim or base, a bottom, and a body containing the handle. These three parts are joined together by "double seaming," as it is termed. This kind of scuttle has tight joints, is light to handle, and very durable with respect to resisting the strain upon its joints because of their being double-seamed, as stated.

Many improvements on this scuttle have been tried; but, in consequence of their benefitting one feature or essential and making no provision for another, there has not as yet been anything manufactured superior to it. For instance, one of these improved scuttles has the base and bottom all constructed of cast-iron—a novelty, but more of a retrograde than a progressive step as respects utility, as it renders the scuttle too heavy and cumbersome to the user when filled with coal, and consequently has not come into public use to any extent.

Another one of these improved scuttles has substituted for sheet-iron, in the bottom, cast metal; and such cast-metal bottom is riveted to the body, having the rim or base secured by being simply "pened over," as it is termed, a bead made on the edge of this bottom. This leaves the base in a very insecure state, and liable to be knocked off when the scuttle is being carried full of coal. This scuttle has also the objection of not having its joints perfectly tight, and therefore the manufacturer is obliged to fill up ,with putty or some kind of cement, the crevices left in it after the parts are riveted and otherwise put together.

Still another of these improved scuttles gives a novel mode of construction by joining the rim and body by means of one or more disks, answering for the bottom; but such mode of construction does not give a durable scuttle, and besides is very complicated in parts and expensive to manufacture.

And still another of these improved scuttles gives the consumer a removable stamped-up bottom and rim in one piece. This admits of a partial removal of parts—that is to say, into two parts—for repairs or replacement, but does not admit of the insertion of a stouter or heavier bottom, if desired, without coming within the objection of the cast-iron rim and bottom scuttle above mentioned.

Now, my improvements follow closely, and consist in making the old double-seamed scuttle, first above described, of three removable parts, and having these parts so arranged to each other that the wear upon any one of them can be corrected by replacing the worn-out or injured part, and so that when these three parts are put together they will be all bound each to the other in a simple, secure, and durable manner, and as effectually as if they were double-seamed, and leaving no crevices to be filled up with putty or cement, this arrangement admitting of the use of heavier metal, such as malleable or other iron, heavy sheet-iron, or copper, in the bottom of the scuttle, for the purpose of getting a more durable and at same time removable bottom without rendering the scuttle so heavy as to add materially to its weight.

It further consists in a shoulder on the exterior of the base or rim, to serve as a support to the body of the scuttle or to the bottom, or both, as shown in the drawings.

To enable others to make and use my said improvements in coal-scuttle, I will proceed to describe its construction.

*a* is the body of the scuttle. *b* is the base or rim. *c* is the bottom. *d d d d* are screws or bolts. *e e e e* are nuts for fastening the same. The base or rim *b* can be struck up out of one piece, or made in the ordinary way. On this base or rim is a shoulder, *f*. The bottom *c* has a flange projecting down all around it, which tightly fits over the base or rim, on, down to, and impinging on the shoulder *f*, as a cover would onto a box; and over this flange of the bottom is placed the body *a*. The edge of the body rests on and is supported by this shoulder *f* on said base or rim.

The arrangement shown brings all three parts together one over the other, sufficiently far to enable them to be secured to each other. By such an arrangement of the parts I can place screws or bolts or other devices through all three thicknesses of metal, and fasten with nuts underneath the bottom, out of view and away from the danger of such fastenings being meddled with.

This arrangement of parts and method of construction of parts give all the strength and advantages of double-seaming, including tightness of joints, effective support of body or bottom, or both, besides admitting of an easy removal of the parts in case repairs are required or replacement of any one of such parts is necessary, and the use of heavy material in the bottom, without adding perceptibly to the weight of the scuttle.

I claim—

1. A coal-scuttle composed of three removable sections, a body, flanged bottom, and base, constructed and arranged as specified.

2. In a coal-scuttle, the combination of the base *b*, provided with a shoulder, *f*, and the flanged body *a* and bottom *c*, substantially as specified.

3. A coal-scuttle consisting of the metallic body, flanged bottom, and base, detachably secured together by means of the screw-bolts and nuts, connecting all of said parts, substantially as specified.

GEORGE SMITH.

Witnesses:
CHARLES SMITH,
JOHN FINK.